3,282,030
Patented Nov. 1, 1966

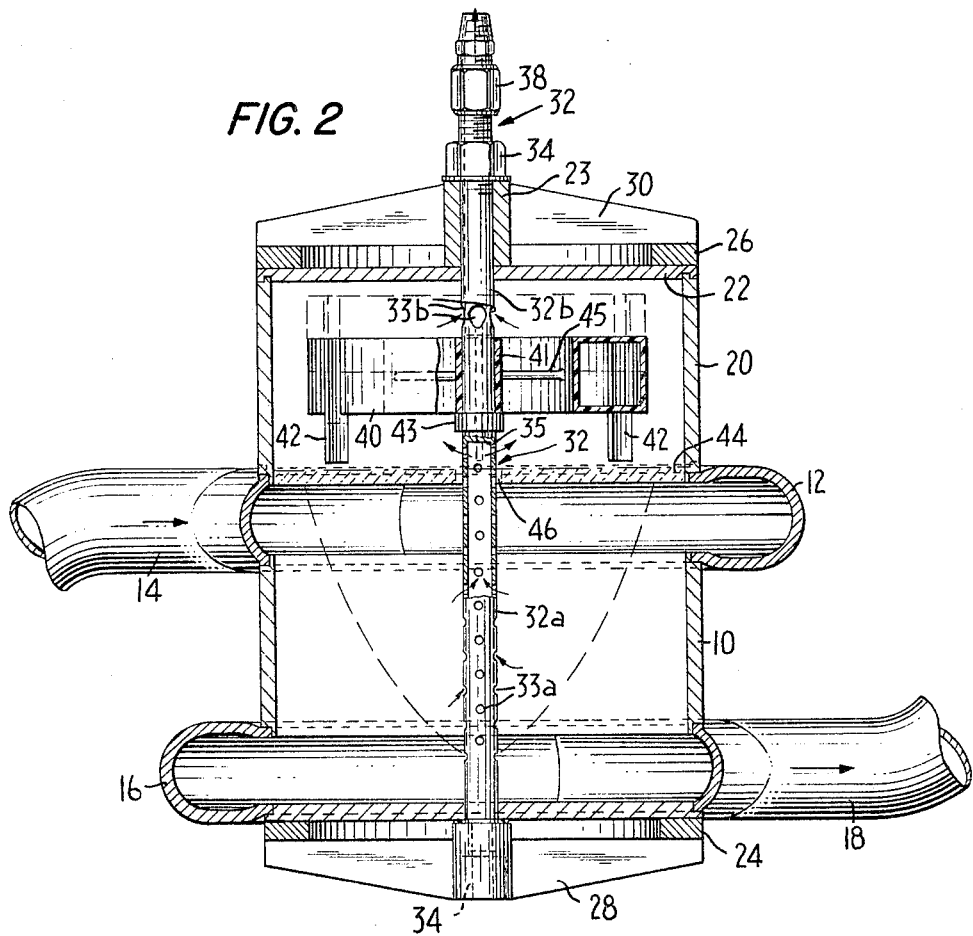
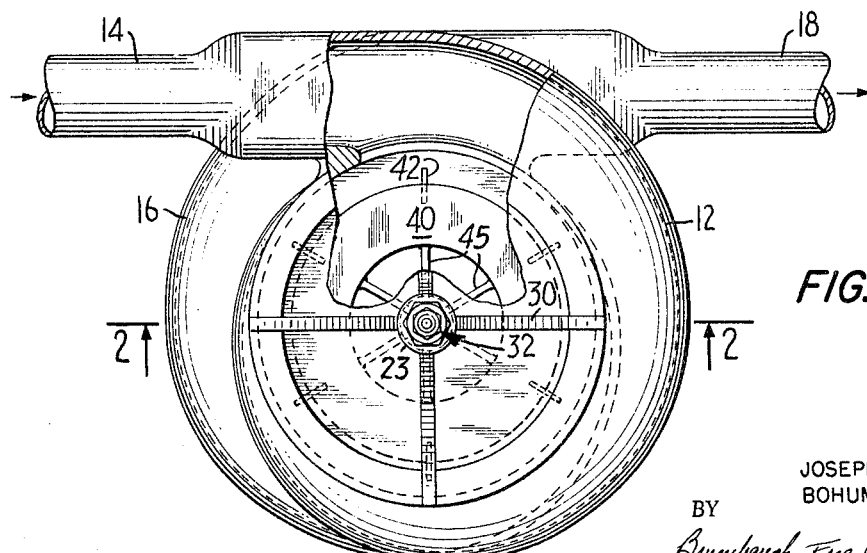

3,282,030
APPARATUS FOR FLUID TREATMENT
Joseph B. Griffo and Bohumir A. Larys, Woodstock, N.Y., assignors to Rotron Manufacturing Company, Inc., Woodstock, N.Y., a corporation of New York
Filed Sept. 25, 1963, Ser. No. 311,558
4 Claims. (Cl. 55—170)

This invention relates to the treatment of fluids, and more particularly to an apparatus for treating fluids flowing in a conduit.

The flow of fluid through a conduit or pipe is often accompanied by undesired disturbances within the flow pattern. Pumping action used to generate the pressure for driving the fluid through the conduit may cause pulsation and turbulence in the flow of fluid, and other factors, such as bends in the flow path and irregularitiees in the internal surface of the conduit also contribute to the unevenness of the flow. Often, too, in the case of liquid flow, unwanted gases, such as air, become trapped or entrained in the liquid, giving rise to bubbling or frothing within the conduit and may, under certain conditions, cause vapor lock and stoppage of flow. Such unwanted gaseous components also may seriously dilute or contaminate the liquid.

All of these effects assume increased importance where metering of the fluid flow in the conduit is required. Turbulences and pulsation in the flow pattern cause erratic operation of metering equipment while entrained gases in a flowing liquid will cause the metering equipment to register incorrectly the amount of liquid flowing past a point in the conduit.

Any irregularity in metering of fluid flow is of obvious concern to the user. Not only can incorrectly metered amounts result in errors in the preparation of products using the fluid, but dilution by entrained gases will reduce the amount of liquid actually delivered, even if the metering equipment otherwise accurately registers the total amount of liquid and entrained gases flowing in the conduit. As a result, the purchaser may be unknowingly paying for a substantial amount of air instead of the liquid he believes he is buying. The problem is noticeably acute in connection with hydrocarbon fluids, such as fuel oil, and milk.

To avoid these unwanted results, the fluid flowing in the conduit should be treated, prior to metering, to make the flow uniform and even, and to remove unwanted gases entrained in the flowing liquid. Accordingly, it is the principal object of the present invention to provide an improved apparatus for accomplishing these ends.

A further object of this invention is to provide an improved apparatus for performing both flow straightening and gas elimination functions simultaneously without significant pressure drop.

Still another object of the invention is to provide an improved valve structure for use with a combination flow straightening and gas eliminating device whereby gases separated from the liquid may be more readily removed.

Briefly, in accordance with the present invention, a fluid which may be flowing in a turbulent or pulsating manner and may contain unwanted gases, is supplied from its conduit to a device which converts the flow along the conduit into a laminar free vortex flow. A suitable device for performing such a function is called a scroll or volute, and is characterized by a curved flow path having a radius that decreases logarithmically with the length of the path. The action of the scroll on the flow input from the conduit establishes a free vortex in a generally cylindrical chamber having one end thereof communicating with the scroll. A substantial pressure gradient exists across the vortex, increasing from effectively a vacuum at its axis to a relatively high pressure at its peripheral layer. The action of the vortex is two-fold, causing any gases entrained in the fluid to collect along the axis of the vortex, leaving the liquid free of unwanted gases, and effectively integrating pulsations and turbulences in the input flow pattern.

At the other end of the vortex chamber, a second scroll is provided which reconverts the vortex flow to straight flow in an output conduit. Since the vortex is created initially entirely from the energy of the input flow in the conduit and substantially all of the energy of the vortex is recaptured by the output scroll, insertion of the device in a conduit produces an insignificant pressure drop.

To draw off the gases separated by the vortex action, valve means are provided within a valve housing mounted atop the vortex chamber. The valve includes a float member movably mounted upon a vertically aligned hollow stem which communicates with the exterior of the housing. Means are provided to enable the collected gases in the vortex chamber to rise into the valve housing along with the liquid, and one or more apertures are provided in the stem to permit the gases to escape to the atmosphere. Initially, the float is raised by the level of the liquid in the valve housing to close the apertures in the stem and prevent any of the liquid from escaping. As gases are collected by the vortex action, the liquid level in the housing drops, lowering the float and exposing the apertures in the stem to permit the gases to escape. As will be seen, this action is automatic and the device is self-regulating.

Free movement of the float member is maintained with the aid of downwardly depending vanes adjacent the periphery of the float. In the lower position of the float, the vanes are subjected to the swirling action of the liquid in the vortex chamber, and as the liquid rises, cause the float to rotate with the liquid in the vortex, preventing binding of the float valve and permitting it to rise more freely to its closed position.

The foregoing and other objects, features and advantages of the invention will be more fully understood from the following detailed description thereof when read in conjunction with the accompanying drawings in which:

FIGURE 1 is a plan view of the apparatus according to the invention partially broken away to show the interior of one of the scrolls; and FIGURE 2 is a vertical cross-section through the device taken along the lines 2–2 of FIGURE 1.

Referring now to the drawings, a preferred embodiment according to the invention includes a vortex chamber 10, generally cylindrical in cross-section and oriented in a vertical position. Atop the upper open end of the chamber 10 is mounted a scroll or volute element 12. As seen best in FIGURE 1, the scroll element 12 directs the flow from the input conduit 14 along a spiral path having a radius that decreases logarithmically with the length of the flow path, to convert from straight flow in the conduit to spiral flow with minimal energy loss. As will be apparent, the swirling fluid from the scroll 12 enters the chamber 10 and establishes a vortex therein.

A second scroll 16 is mounted at the bottom end of the vortex chamber 10 and so disposed with respect to it as to reconvert the vortex flow within the chamber 10 into straight flow in the output conduit 16. The scroll 16 is identical to scroll 12 except for the direction or sense of its curvature, as is clearly shown in FIGURE 1. It will be understood that although the output conduit 16 is shown aligned to provide fluid flow continuing in the same direction as the input conduit 14, the output scroll 16 may assume any orientation between 0° and 360° with respect to input scroll 14.

Atop the input scroll 12 is mounted a valve housing 20 which may be similar in cross-section to the vortex chamber 10. The upper end of the housing 20 is closed by disc member 22 having an aperture and a short axial sleeve 23 at its center. A pair of clamping rings 24, 26 are provided respectively at the bottom and top of the entire assembly. Clamping spiders 28 and 30, at the lower and upper ends respectively of the structure, hold the assembly together with the aid of axial member 32, which is threaded at each end and extends through the entire structure. Bolts 34 at both ends of the member 32 maintain all of the elements rigidly in their assembled positions. Suitable gasket or sealing means are provided at each joint between respective elements of the assembly so that leakage of liquid or gases does not occur.

The axial member 32 preferably includes two hollow portions, designated 32a and 32b respectively. The portion 32a traverses the entire vortex chamber 10 from the lower spider 28 and extends at its upper end into the valve housing 20. A plurality of apertures 33a are provided through the walls of the tubular portion 32a along its length to permit fluid communication therethrough between the chamber 10 and the housing 20. The upper end of the portion 32a is closed at 35.

The upper portion 32b of the axial member is similarly hollow from a point beginning well within the housing 20 and extending outside of the housing. A suitable coupling 38 is provided at the exterior end of portion 32b for connection to any convenient form of output hose or the like. The lower end of the tubular member 32b within the housing 20 includes a plurality of apertures 33b, enabling gases trapped in the housing 20 to escape through the portion 32b to the output hose.

A hollow annular valve float 40, made of a lightweight material such as plastic, is supported by a plurality of spokes 45 radially extending from an axial sleeve 41. The sleeve 41 closely surrounds the portion 32b, which serves as the valve stem, and is both rotatable about it and movable up and down along its length. A stop 43 is provided on the stem portion 32b slightly above its juncture with the upper end of the tubular portion 32a to limit the downward movement of the float 40.

The float 40 also includes a plurality of vane members 42 spaced about its periphery and depending downwardly from the float. As will be explained more fully hereinafter, the vane members 42 enable the swirling motion in the liquid that may rise into the valve housing to be imparted to the float 40, thereby rotating it about the stem 32b.

The vortex chamber 10 and the valve housing 20 may either be completely open to one another, or separated by a septum 44 (shown in dotted lines) provided with an opening 46 about its mid-point to establish a fluid communication path between the chamber and the housing.

In operation, the fluid flowing in the input conduit 14, which may be a mixture of liquid and unwanted, entrained gases, and which may be flowing in a turbulent and/or pulsating fashion, has its flow pattern converted into spiral or vortex flow by the input scroll 12. A free vortex is thus created within the chamber 10 having a relatively high angular velocity and kinetic energy content. The action of the vortex establishes a pressure differential across the rotating flow such that the pressure is at its lowest value along the axis of the vortex and increases radially outward therefrom. As a result of the pressure differential, entrained gases in the liquid move towards the low pressure area and collect about the axis of the vortex chamber.

When fluid flow into the device is initiated, the fluid will tend to fill the entire vortex chamber 10 and rise up into the valve housing, either through the completely open top of the chamber 10 or through the opening 46, if the septum 44 is utilized, and the hollow portion 32a of the axial member 32. In either case, the liquid rising into the housing 20 has a swirling motion as a result of the action of the scroll 12. As the rising liquid level reaches the vanes 42 on the float 40, the rotational motion is imparted to the float and it begins to revolve about the stem portion 32b. The rising liquid level at the same time lifts the entire float 40 upwardly along the stem portion 32b to an upper position, such as shown in dotted lines in FIGURE 2. In the upper position, the axial sleeve 41 of the float 40 blocks the apertures 33b in the stem 32b and thus prevents liquid, as well as gases, from escaping from the housing 20.

As the vortex flow within the chamber 10 builds up, liberated gases tend to collect about the axis of the chamber and the amount of liquid within the device correspondingly decreases. Ultimately, the gas-liquid distribution within the chamber 10 may assume approximately the division shown by dashed lines in FIGURE 2. At this point, the liquid level within the valve housing 20 has dropped to an extent such that the valve float 40 is no longer supported in its upper position and tends to fall to the limit established by the stop 43. At the same time, the gases collected within the chamber 10 are rising into the valve housing 20 either through the open top of the chamber 10 or through the apertures 33a in the tubular portion 32a and thence into the housing 20. With the apertures 33b now open, these gases are free to escape therethrough and out through the member 32 to the atmosphere or any suitable collection means.

As these gases escape, the amount of liquid within the chamber 10 begins to increase and eventually reaches the point where the liquid level within the valve housing 20 again rises to lift the float 40 and close the exit ports 33b. The continuing vortex action meanwhile, is separating entrained gases as previously described, and after a time depending upon the amount of entrained gases, will cause the valve to reopen. It will be seen therefore, that the action of the float 40 is completely automatic and quickly permits collected gases to escape from the vortex chamber, at the same time preventing discharge of any of the liquid. The rotating motion imparted to the float 40 before it is moved vertically, eliminates any sticking or binding effects that would occur if it were attempted to simply move the entire float structure straight up or down about the stem member 32b. The pre-rotation of the valve float 40 thus induced avoids one of the annoying problems present in known forms of float valves.

During the above-described action, the liquid in vortex flow within the chamber 10 is being discharged via the outlet scroll 16 to the output conduit 18. The liquid thus delivered will be substantially free of unwanted entrained gases and will have a substantially straight flow pattern, as a result of the action of the vortex flow which effectively removes the turbulences and/or pulsations present at the input. The smooth flowing, undiluted liquid may now be accurately metered and full measure delivered to the purchaser. Moreover, the double scroll arrangement of the invention allows relatively lossless conversion and reconversion of the fluid flow energy within the devices, thereby minimizing unwanted pressure drops. If the device is inserted in a fuel oil delivery line, for example, it would introduce substantially no impediment to normal flow rates.

Although a preferred form of the invention has been illustrated in the drawings, it will be realized that many modifications thereof will occur to those skilled in the art. For example, the scrolls 12 and 16 and the chamber 10 and housing 20, together with their sealing end plates may be welded together or cast as a single piece, eliminating the necessity for the threaded central member 32 and clamping bolts 34. In such an arrangement, the septum 44 may be omitted entirely along with the portion 32a and only the upper end of the stem 32b with its stop member 41 and apertures 33b need be included. Furthermore, the vanes 42 on the float member 40 may be of any convenient shape suitable for imparting rotational motion to the float 40, which itself may be shaped in any suitable manner. The entire structures may be fabricated out of various materials, such as steel, aluminum, or plastics, capable of withstanding the pressures involved in the particular application in which it is to be used and compatible with the type of fluid to be treated. Thus, for example, plastics may be suitable for use with fluid milk, but unsuitable for hydrocarbon fluids.

As noted hereinabove, the relationship of the input and output scrolls can be adjusted to provide any desired angle, from 0° to 360°, between the input and output conduits. Thus, the device may also serve the added function of changing the direction of the flow in the conduit without introducing a pressure drop. Also, if desired, the lower scroll may be used as the input and the upper scroll as the output, without substantial diminution of effectiveness. The device is thus capable of functioning properly in a fluid conduit in which the direction of flow is reversible.

Accordingly, it is intended that the invention be limited only by the scope of the appended claims.

We claim:

1. Apparatus for the treatment of liquid flowing through a conduit, which liquid may contain unwanted, entrained gases, comprising, chamber means coupled to said conduit for converting the straight liquid flow in said conduit into a free vortex flow and thereafter reconverting said free vortex flow into straight flow for continued passage along said conduit, the free vortex flow resulting in the gathering of the entrained gases substantially along the vortex axis, a valve housing coupled to said chamber means, a hollow tubular member mounted longitudinally along the vertical axis of said chamber means and extending into said valve housing to establish fluid communication between said chamber means and said housing, said tubular member having a plurality of apertures therealong for enabling both said liquid and said gases gathered along said vortex axis to enter said housing, a vertically oriented hollow stem mounted in said housing having an open upper end extending outside of said housing, at least one aperture in said stem at a point therealong within said housing, and a valve float movably mounted on said stem adapted to rise to an upper position to close said aperture when the liquid level in said housing rises and to fall to lower position to open said aperture when the liquid level falls.

2. Apparatus for the treatment of liquid flowing through a conduit, which liquid may contain unwanted, entrained gases, comprising, chamber means coupled to said conduit for converting the straight liquid flow in said conduit into a free vortex flow and thereafter reconverting said free vortex flow into straight flow for continued passage along said conduit, the free vortex flow resulting in gathering of the entrained gases substantially along the vortex axis, a valve housing mounted above said chamber means and in fluid communication therewith enabling both said liquid and gathered gases to enter said housing, a vertically oriented hollow stem mounted in said housing having an upper end in communication with the outside of said housing, at least one aperture in said stem at a point therealong within said housing, a valve float slidably and rotatably mounted on said stem adapted to rise to an upper position to close said aperture when the liquid level in said housing rises and to fall to lower position to open said aperture when the liquid level falls, and vane means on said float for causing said float to rotate about said stem when subjected to the vortex flow of liquid in said housing.

3. Apparatus for the treatment of liquid flowing through a conduit, which liquid may contain unwanted, entrained gases, said apparatus adapted to be interposed for a segment of said conduit comprising, a generally cylindrical chamber oriented with its axis substantially vertical, means coupled between said conduit and one end of said chamber and responsive to the liquid flow to establish a free vortex in said chamber, whereby said entrained gases tend to collect along the axis of the chamber, means coupled between the other end of said chamber and a continuation of said conduit for reconverting said free vortex in said chamber to straight flow in said conduit, a valve housing mounted above said chamber and in fluid communication therewith, a hollow tubular member mounted longitudinally along the axis of said chamber and extending into said valve housing, a plurality of apertures in said tubular member for enabling gases collected therealong to rise into said housing, a hollow cylindrical stem in said valve housing axially aligned with said tubular member and having its open upper end extending outside of said housing, at least one aperture in said stem at a point therealong within said housing, a valve float movably mounted on said stem adapted to rise to an upper position to close said aperture when the liquid level in said housing rises and to fall to a lower position to open said aperture when the liquid level falls, and vane means on said float for causing said float to rotate about said stem when subjected to the action of swirling liquid in said housing.

4. Apparatus for the treatment of liquid flowing through a conduit, which liquid may contain unwanted, entrained gases, said apparatus adapted to be interposed for a segment of said conduit comprising, a generally cylindrical chamber oriented with its axis substantially vertical, an input scroll having an inlet portion adapted to be coupled to said conduit and having its outlet portion in fluid communication with the interior of said chamber at its upper end, an output scroll having its inlet portion in fluid communication with the lower end of said chamber and an outlet portion adapted to be coupled to a continuation of said conduit, a hollow valve housing coupled to the upper side of said input scroll and substantially concentric therewith, a hollow tubular member mounted longitudinally along the axis of said chamber and extending into said valve housing, a plurality of apertures in said tubular member enabling fluid communication within said member between said chamber and said housing, a hollow cylindrical stem in said valve housing axially aligned with said tubular member and having its upper open end extending outside of said housing, at least one aperture in said stem at a point therealong within said housing, a generally cylindrical valve float rotatably mounted on said stem and adapted to close said aperture in said stem when raised to an upper position, vane means on said float for imparting rotation to said float in response to immersion of said vanes in rotating fluid, and means provide fluid communication between said chamber and said valve housing.

References Cited by the Examiner

UNITED STATES PATENTS

| 1,440,808 | 1/1923 | Wineman | 55—205 |
| 2,323,525 | 7/1943 | Ebel et al. | 55—205 |
| 2,428,045 | 9/1947 | Sharp et al. | 55—165 |

REUBEN FRIEDMAN, *Primary Examiner.*

C. N. HART, *Assistant Examiner.*